Patented May 1, 1923.

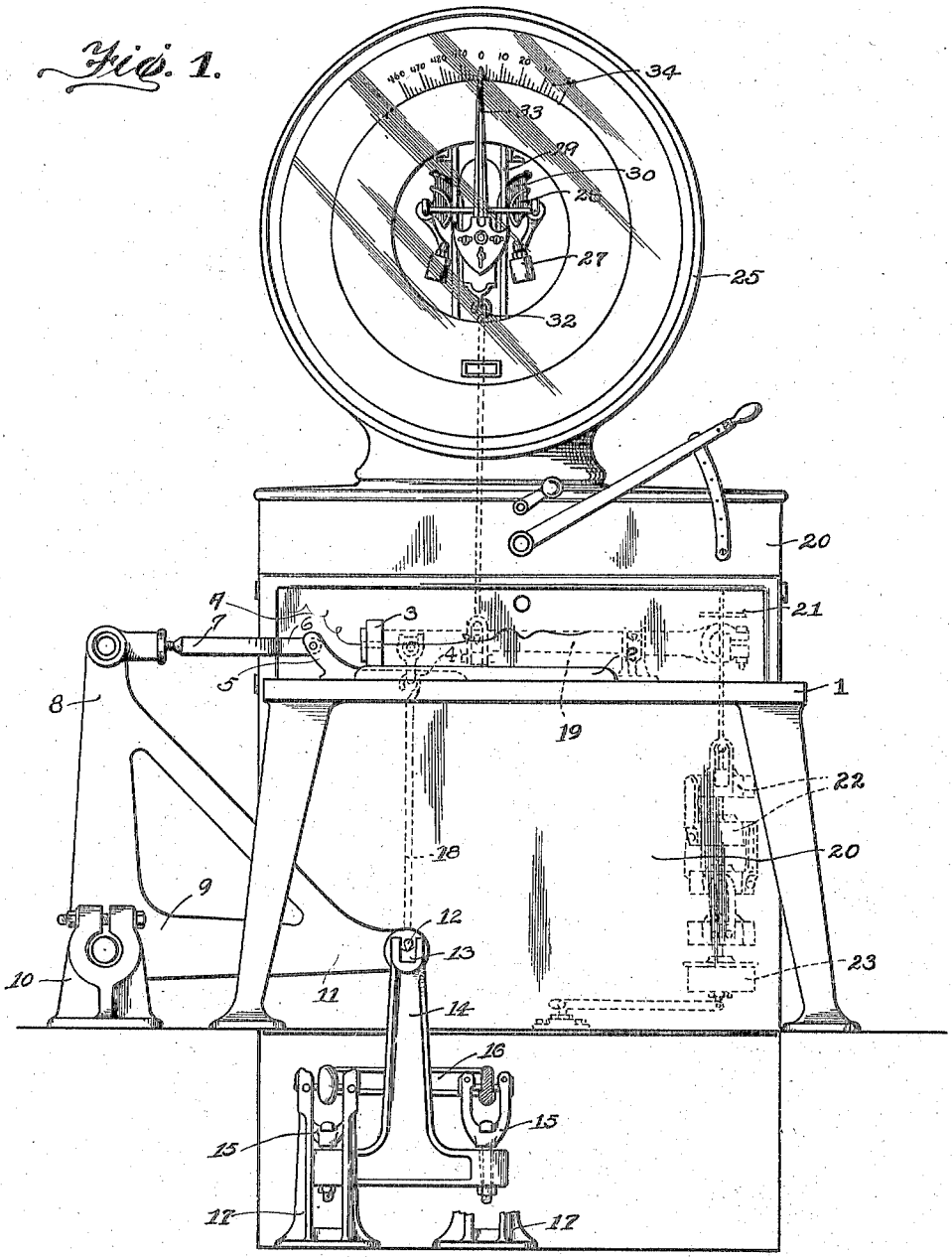

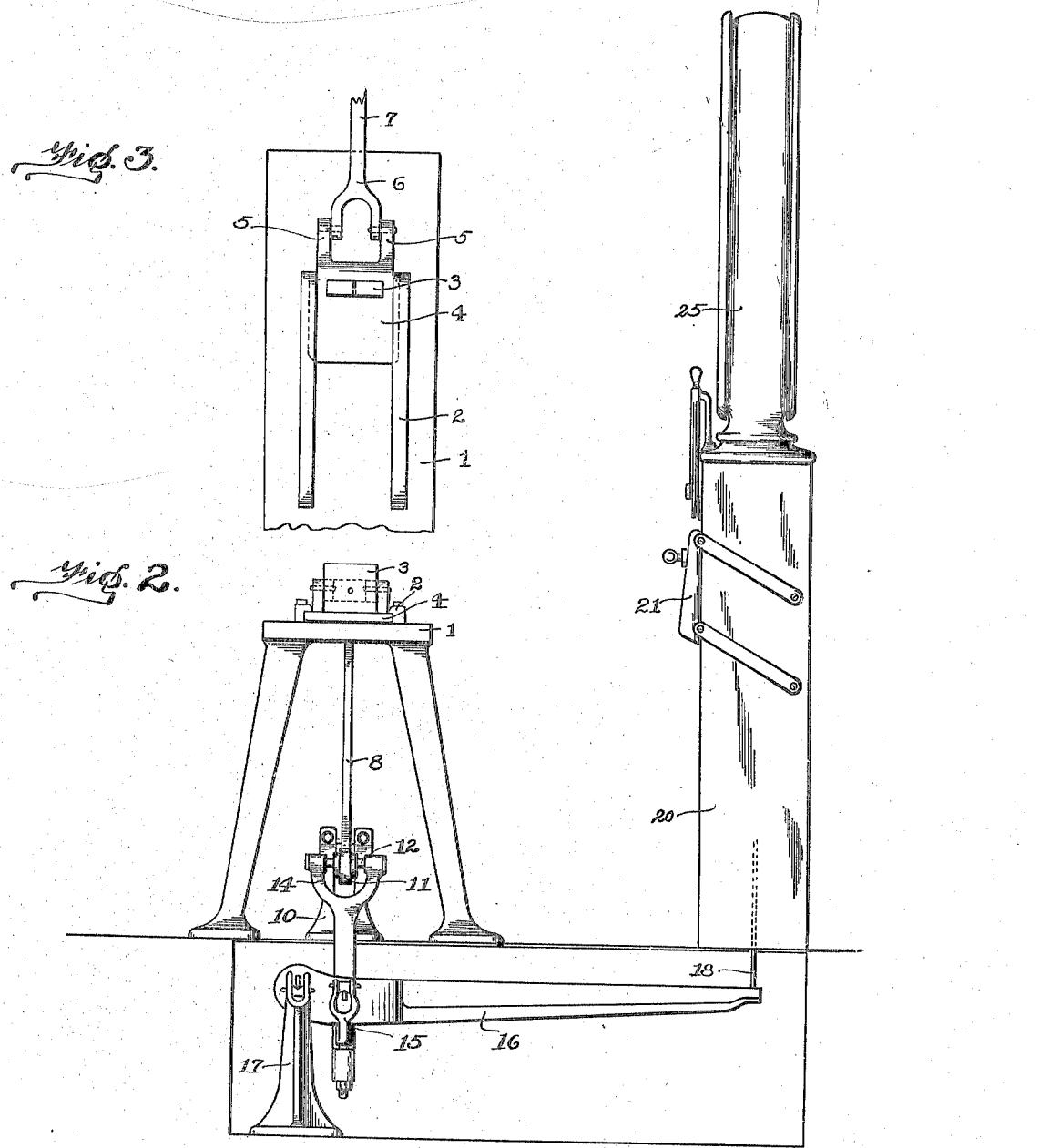

1,453,355

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WIREDRAWING SCALE.

Application filed February 25, 1920. Serial No. 361,249.

*To all whom it may concern:*

Be it known that I, HALVOR O. HEM, a citizen of the United States, residing at Toledo, in the county of Lucas and State of Ohio, have invented certain new and useful Improvements in Wiredrawing Scales, of which the following is a specification.

This invention relates to force measuring instruments, particularly instruments designed to measure the force exerted in drawing a wire through a die, and one of its principal objects is to provide means which indicate at all times the tension upon the wire which is being drawn so that the speed of the drawing machine and other conditions may be properly regulated.

Another object is the provision of an instrument of this character having a wide capacity range so that it may be used to measure the tension of wire of all gages.

Still another object is to provide such an instrument having means adapted to be set for measuring a fixed major portion of the force exerted in drawing a wire and automatic means for measuring and indicating the variable remainder of such force.

Other objects and advantages will be apparent from the following description, in which reference is had to the accompanying drawings illustrating a preferred embodiment of my invention and in which similar reference numerals designate similar parts throughout the several views.

In the drawings:—

Figure 1 is a front elevation of a force measuring machine embodying my invention;

Figure 2 is a side elevation thereof; and

Figure 3 is a plan view of the die and the parts immediately connected therewith.

Referring to the drawings in detail, the die is supported upon a bench or analogous support 1 which is provided with a pair of guides 2 to permit limited horizontal movement of the die. The die proper 3 is fixed upon a horizontal plate 4, the edges of which are contained in grooves in the guides 2. A pair of arms 5 extends upwardly and rearwardly from the plate 4 to form a means for connecting the die-carrying plate to the lever mechanism of a measuring instrument which is so arranged that the connection is on a level with the opening in the die through which the wire A is drawn.

Hingedly attached to the arms 5 is a bifurcated member 6 constituting a part of a link 7, the link 7 being made in two parts threaded together so that its length may be conveniently adjusted. The opposite end of the link 7 is hingedly connected to the end of an upright arm 8 of the bell-crank lever 9 fulcrumed upon a bracket 10 secured upon the floor supporting the machine. The other arm 11 of the bell-crank lever 9 extends horizontally so that horizontal movement of the die 3 results in downward movement of the horizontal arm 11 of the bell-crank lever. The free end of the arm 11 carries a knife edge pivot 12 which extends from both sides thereof and rests in aligned grooved bearings 13 carried in the bifurcated upper end of a thrust member 14. The lower end of the member 14 is provided with horizontal extensions lying substantially at right angles to the bifurcations at the upper end of the member 14. U-shaped yoke members 15, having their bight portions connected to the horizontal extensions of the member 14 by means of vertically-extending bolts and carrying aligned grooved bearings in their upper ends, serve to connect the member 14 to a horizontal lever 16. The horizontal lever 16 is substantially Y-shaped and its forked ends are provided with fulcrum pivots which rest in grooved bearings supported by the fulcrum stands 17. Owing to the form of the member 14, with upper forks and lower extensions extending in planes at right angles to each other, a downward force may be exerted on the thrust member 14 without danger of tilting it.

From the nose of the lever 16 a steelyard 18 extends upwardly to connection with the beam lever 19 supported in a cabinet 20. Access to the interior of the cabinet is had by means of an opening in the front thereof, normally covered by a door 21.

The beam force measuring mechanism contained in the cabinet is substantially the same as that shown in my Patent No. 1,423,660, patented July 25, 1922, and comprises in addition to the beam lever 19 a series of unit weights 22 and means to deposit them one by one upon a counterpoise pan 23 connected to the beam 19. Since my present invention does not reside in this weighing mechanism per se, I will not describe it in detail.

The cabinet 20 is surmounted by a head 25 having substantially the shape of the casing of a watch and containing automatic force measuring mechanism of the type shown and described in the patent to Hapgood, 1,203,611, November 7, 1916. Since this weighing mechanism per se is not of my invention, I will describe it only in such detail as will suffice to show its connection with the other elements of the invention. It consists essentially of a pair of oppositely-swinging pendulums 27, rigid with which are fulcrum sectors 28 suspended by means of flexible ribbons from a frame 29 contained in the head 25. The pendulums 27 are also provided with power sectors 30 which are connected, by means of steel ribbons, to a hook rod 32 extending downwardly and connected to the beam lever 19. An indicating hand 33 is so connected to the pendulum mechanism as to move over the dial 34 when the pendulums swing upwardly and outwardly to counterbalance the pull upon the die 3, the dial 34 being graduated and marked so that the tension of the wire is indicated thereon in pounds.

In the operation of the device, when it is used to indicate the amount of force exerted in drawing light wire, none of the unit weights 22 are placed upon the counterpoise pan 23. The pull is transmitted through the bell-crank lever 9, the horizontal lever 16 and the beam lever 19 to the pendulum mechanism in the head 25 and is indicated on the chart 34 by the indicating hand 33. When the instrument is used for measuring the force exerted in drawing heavy wire, one or more unit weights are placed on the pan 23 and the major portion of the pull on the wire is thus measured by the beam mechanism in the cabinet 20, leaving only the variable remainder to be measured and indicated by the mechanism in the head 25.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In wire drawing apparatus, a movable member adapted to engage a wire being drawn, and a force measuring instrument operatively connected to said member to indicate the force exerted in moving said member.

2. In a device of the class described, a wire drawing die, a force measuring instrument, and means operatively connecting said force measuring instrument to said wire drawing die.

3. In a device of the class described, in combination, a wire drawing machine, and means whereby force exerted by said machine in drawing wire is indicated.

4. In a device of the class described, a movable die, means for resisting movement of said die, and means for measuring the force exerted in moving the said die against said resistance.

5. In a device of the class described, a movable die, force measuring means connected thereto, said means including motion multiplying levers, yieldable force resisting mechanism, and indicating mechanism connected thereto.

6. In a device of the class described, a die having horizontal movement, means for converting such horizontal movement into vertical movement, and gravity means for measuring the force exerted in moving said die.

7. In a device of the class described, a die having horizontal movement, means for converting such horizontal movement into vertical movement, and pendulum mechanism for measuring the force exerted in moving said die.

8. In a device of the class described, a die having horizontal movement, a bell-crank lever connected thereto to convert horizontal force exerted to move said die into vertically acting force, and gravity-controlled means connected to said bell-crank lever to measure said force.

9. In a device of the class described, a die having horizontal movement, a bell-crank lever connected thereto to convert horizontal force exerted to move said die into downwardly-acting force, and gravity-controlled means connected to said bell-crank lever to measure said force.

10. In a device of the class described, a movable member adapted to engage a wire being drawn, means operatively connected to said member to offset a fixed major portion of the force exerted in moving said member, and means to automatically offset the remainder of such force.

11. In a device of the class described, a wire drawing die capable of being moved by the force exerted in drawing a wire therethrough, means operatively connected to said die to offset a fixed major portion of the force exerted in drawing such wire, and means to automatically offset the remainder of such force.

12. In a device of the class described, in combination, a wire drawing die, means including manually shiftable weights for offsetting a fixed major portion of the force exerted in drawing a wire through said die, and automatic means for offsetting the variable remainder of such force, 13. In a device of the class described, in combination, a wire drawing die, means including manually shiftable weights for offsetting a fixed major portion of the force exerted in drawing a wire through said die, and pendulum mechanism for offsetting the variable remainder of such force.

14. In a device of the class described, in combination, a wire drawing die, means including manually shiftable weights for offsetting a fixed major portion of the force exerted in drawing a wire through said die, pendulum mechanism for offsetting the variable remainder of such force, and means for indicating in pounds the value of such major portion and variable remainder of the force so offset.

15. In a device of the class described, in combination, a plate, a wire drawing die secured thereon, a pair of arms extending from said plate to points symmetrically located with respect to the opening in said die, and force measuring mechanism connected to said arms.

HALVOR O. HEM.

Witnesses:
C. E. WILCOX,
C. O. MARSHALL.